US005799614A

United States Patent [19]
Greenwood

[11] Patent Number: 5,799,614
[45] Date of Patent: Sep. 1, 1998

[54] COMPREHENSIVE REPTILIAN ENVIRONMENT CONTROL SYSTEM

[75] Inventor: Jon Brady Greenwood, Arvada, Colo.

[73] Assignee: FCT, Inc., Arvada, Colo.

[21] Appl. No.: 747,543

[22] Filed: Nov. 12, 1996

[51] Int. Cl.$^6$ .................................................. A01K 67/00
[52] U.S. Cl. .................................................. 119/452
[58] Field of Search .................................. 119/448, 452

[56] References Cited

U.S. PATENT DOCUMENTS

| 4,700,887 | 10/1987 | Timmons | 119/448 |
|---|---|---|---|
| 4,711,294 | 12/1987 | Jacobs et al. | 165/19 |
| 4,773,471 | 9/1988 | Grant et al. | 119/448 X |
| 4,930,446 | 6/1990 | Huisinga | 119/448 |
| 5,010,845 | 4/1991 | Azpurua et al. | 119/17 |
| 5,119,762 | 6/1992 | Yockey et al. | 119/448 |
| 5,136,980 | 8/1992 | Schoeber et al. | 119/448 |
| 5,193,483 | 3/1993 | Crider et al. | 119/448 |
| 5,261,352 | 11/1993 | Stammelman | 119/28.5 |
| 5,272,316 | 12/1993 | Chesnut | 219/385 |
| 5,307,762 | 5/1994 | Englert | 119/266 |
| 5,492,082 | 2/1996 | Krevinghaus et al. | 119/448 |

OTHER PUBLICATIONS

Ecologic Technologies; Misting Systems for Amphibians, Reptiles, and any other Tropical Plants or Animals.
Biostat; A Product of the Aquaheat Corporation.
Zoo Med Laboratories; Reptile Temp Thermostats.
Helix Controls; Proportional Controllers.
Bush Herpetological Supply; Reptile Cages; heating.
Lyon Reptile Products; 1996.

*Primary Examiner*—Thomas Price

[57] ABSTRACT

A comprehensive reptilian environment control system is provided that maintains a reptile enclosure within desired temperature and humidity ranges. The control system including the heat and humidity sources are provided in compact, convenient and safe modules which rest atop the enclosure. The user dials in the desired temperature and humidity settings and the control system automatically maintains the desired conditions. The system also provides simulated day and night lighting conditions. The system also provides simulated day and night temperature and humidity conditions by adjusting the temperature and humidity setpoints during the simulated night lighting conditions. A simple and reliable humidity source is also provided as part of the comprehensive environment control system.

14 Claims, 6 Drawing Sheets

| | 801 | 802 | | 803 | |
|---|---|---|---|---|---|
| | CURRENT CONDITIONS | R (707) | S (705) | Q (709) | Q̄ (710) |
| 804 | T < L | 1 | 0 | 1 | 0 |
| 805 | L < T < H | 1 | 1 (AFTER S=0, R=1) | 1 | 0 |
| 806 | T > H | 0 | 1 | 0 | 1 |
| 807 | L < T < H | 1 | 1 (AFTER S=1, R=0) | 0 | 1 |

COMPREHENSIVE REPTILIAN ENVIRONMENT CONTROL SYSTEM

FIELD OF THE INVENTION

This invention relates to environmental control systems and, in particular to the control of environments for reptiles and amphibians. An environmental control system is provided which controls temperature, humidity, and photoperiod, at low cost, in a compact package.

STATEMENT OF THE PROBLEM

When an animal is housed in an environment other than its natural environment, special considerations must be given to the artificial environment in which the animal is housed. Failure to sufficiently replicate the animal's natural environment can be detrimental, even fatal, to the animal. When the animal is a reptile or amphibian the difficulty in replicating the natural environment is amplified because the natural environment of reptiles and amphibians (hereinafter the "reptilian environment") is so different from that of the desired indoor living environment for humans.

The proper reptilian environment provides the appropriate balance of heat, humidity and light for the particular reptile or amphibian. Currently available products for controlling reptilian environments are generally limited to systems providing heat, humidity, or light individually. These products include various heated devices such as simulated rocks and tree limbs, ceramic and incandescent infra-red heating bulbs, broad-spectrum florescent light bulbs and fixtures, black-lights, under-tank heating pads, thermostats, rheostats, and misting systems. Industrial environmental test chambers exist which allow precise control of temperature and humidity but these generally cost many thousands of dollars and would not be suitable for adapting to a hobbyist's terrarium.

Existing heaters rely on radiation, passive convection, and passive conduction of heating devices which reside directly within or beneath the environment enclosure. U.S. Pat. No. 5,272,316 issued to Baines on Dec. 21, 1993 describes a heating element formed within a simulated tree branch. The heating element is placed within the terrarium and can be used by the animals as a resting place. In addition to not accounting for humidity and light requirements of the housed reptile, the Baines device provides no control for maintaining a particular temperature within the housing.

U.S. Pat. No. 5,261,352 issued to Stammelman on Nov. 16, 1993 describes a heating element formed within a simulated rock. As with the Baines device, the heating element of Stammelman provides an aesthetically pleasing heating element but does not address the remaining environmental needs of the reptile living within the enclosure. These devices consume valuable space within the enclosure and also present safety hazards since the animal can potentially come into contact with electrically active components.

Existing humidifiers rely on direct acting humidistats which are often costly and relatively inaccurate. Many currently available direct sensing humidistats rely on sensing methods which exhibit significant sensor-to-sensor variation, drift, and hysteresis, and are therefore unable to provide the interchangeability and stable humidity control desired for a reptilian environment control system. Direct sensing humidistat elements must be exposed directly to the humidity of the environment and can be rendered temporarily inoperable or even permanently damaged if ever exposed to 100% humidity, saturated, or submerged in water. Almost all alternative direct sensing humidistats and humidity sensors require a large and complex sensor package requiring vents or ports to expose the sensing element directly to the humidity. Many direct acting thermostats and humidistats require that the humidifier and heater loads be switched in the reptilian environment potentially exposing reptiles or their owners to hazardous electrical voltages and currents. In addition, existing humidifiers attach directly to the environment enclosure again consuming space within the enclosure and presenting a potential safety hazard.

Existing light systems have not incorporated photoperiod timing control for automatically providing the biologically appropriate lighting for a particular reptile or amphibian. U.S. Pat. No. 5,307,762 issued to Englert on May 3, 1994 describes a hood, or cover, for a reptile terrarium or tank. The reptile tank hood of Englert addresses the photo, or light, needs of the reptile. Englert provides a hood that fits over a standard sized terrarium, a fluorescent light source, and an incandescent light source. Each of the light sources is separately switched. The Englert device recognizes the need to provide the reptile with both a broad spectrum light as well as a more narrow spectrum light for heating purposes but, as with the other prior art, fails to provide a comprehensive, controlled environment for the reptile. Even within the limited area of the light needs of the reptile, the Englert device does not provide an automated solution but rather only provides the user the ability to independently switch the two light sources.

U.S. Pat. No. 5,010,845 issued to Azpurua et al. on Apr. 30, 1991 describes a reptile cage apparatus. A resistance heater and infra-red light source, controlled by a thermostat, are included to provide heating for the enclosure. A humidistat controlled humidifier is provided to adjust the moisture content of the enclosure. All of the above apparatus is connected to, or hung from, the sides of an existing terrarium. The user can adjust the various heating and humidity elements to attempt to maintain the desired environment. There is no comprehensive control provided for coordinating the application of heat, light, and humidity within the enclosure. The humidifier and direct-acting humidistat described in the Azpurua patent has all of the disadvantages of direct acting humidistats described above. In addition, the humidifier assembly has a single small plug for filling the reservoir of the humidifier with no means for removing, replacing, or cleaning the inside of the humidifier reservoir without removing the entire assembly. No description of the internal workings of the humidifier is provided other than that it incorporates a fan. The means by which humidity is transferred from the water to the air within the humidifier is not described. Simply blowing air over a non-heated water surface is a very inefficient means of generating humidity.

There currently exists a need for a reptilian environment control system which actively senses and controls temperature and humidity while simultaneously controlling photoperiod. There exists a further need for such a reptilian environment control system that comprehensively controls the reptilian environment in a low cost, safe, compact and modular package, easily adaptable to enclosures commonly used as captive reptile environments.

STATEMENT OF THE SOLUTION

The above-described problems and others are solved and an advance in the art is thereby achieved by the environment control system of the present invention. A single, integrated control system provides the proper balance of heat, humidity and light within the enclosure. The proper reptilian environment is maintained with greater accuracy, lower cost, and with an ease of use not available in existing devices.

The problem of sensing and controlling temperature and humidity simultaneously is addressed by providing separate dry-bulb and wet-bulb temperature sensors. Signals from the sensors are used to control heat and humidity sources to maintain the proper heat and humidity levels within the enclosure. Dry-bulb or sensible temperature is maintained within the desired range by suspending or mounting the dry-bulb temperature sensor within the enclosure. The dry-bulb sensor is used in conjunction with a control system of suitable sensitivity and switching differential to energize one or more heat source(s) for adding heat to the environment in response to the sensed temperature of the enclosure. Similarly, wet-bulb temperature, a measured value having a known and predictable relationship to humidity, is maintained within the desired range by suspending the wet-bulb temperature sensor within a humidifier module in a manner such that it is surrounded by a continuously wetted evaporative media. Air is moved from the enclosure across the wet-bulb sensor so that the wet-bulb temperature of the enclosure is sensed by the wet-bulb sensor. The wet-bulb sensor is used in conjunction with a control system of suitable sensitivity and switching differential to energize the humidifier in response to the sensed humidity level of the enclosure.

Control of light or photoperiod is accomplished with an electromechanical or electronic timer capable of switching one or more suitable light source(s) on and off to create the desired photoperiod and light quality appropriate for the specific animal housed in the enclosure. The timer includes control features allowing adjustable settings for the duration of simulated daylight and night periods. The timer includes switching logic that simultaneously reduces the wet-bulb and dry-bulb temperature set-points to simulate the temperature drop which occurs during the night in the natural outdoor environment.

The heater assembly utilizes forced air to transfer the heat and can therefore be located on top of, adjacent to, or outside of the environment connected via suitable ducting thereby providing desirable modularity and safety while not occupying space within the environment. The modular heater assembly consists of a compact heating element and a fan contained within an enclosure. In response to a demand for increased temperature in the environment, the heating element and fan are energized simultaneously by the output of the dry bulb thermostat. The fan withdraws air from the reptilian environment through an inlet duct or opening, forces it through the heater module—transferring heat from the heating element to the air, and then returns heated air to the environment through an outlet duct or opening. It is expected that, in addition to the modular heater assembly described, multiple heating sources such as infra-red heat lamps and under-tank heating pads may be simultaneously used and controlled by the reptilian environment control system of the present invention.

The humidifier assembly utilizes forced air to transfer moist air to the enclosure and can therefore be located on top of, adjacent to, or outside of the environment connected via suitable ducting thereby providing desired modularity, and safety while not occupying space within the controlled environment.

The wet-bulb and dry-bulb temperature sensors as implemented in the preferred embodiment are electrically harmless and are not capable of harming reptiles or humans even if directly shorted, damaged, or exposed. In addition, they exhibit excellent interchangeability, stability, and repeatability. In the present invention, they are very compact, minimizing the space taken up in the reptilian environment, and can be provided with a waterproof coating, encased in a flexible waterproof sheath, or even hermetically sealed in a small diameter corrosion resistant sheath, thereby addressing all of the concerns mentioned above.

DETAILED DESCRIPTION

Figure 1:
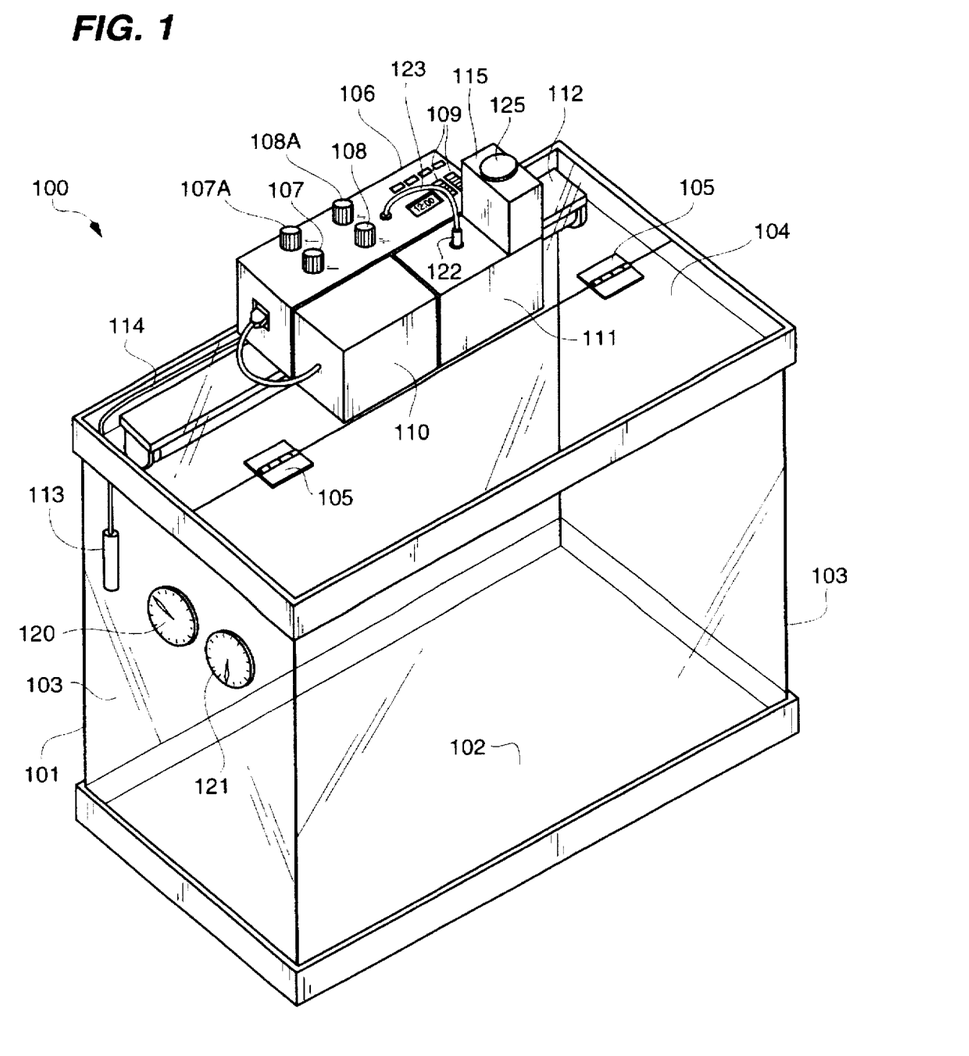
FIG. 1 illustrates a reptile enclosure in which is implemented the present invention.

Description of Overall System—FIG. 1

FIG. 1 depicts a reptilian environment control system 100 according to the present invention. Enclosure 101, having bottom 102 and sides 103, defines the environment to be controlled by the present invention. The open top of enclosure 101 is covered by hinged cover 104 having hinges 105 so that hinged cover 104 can be opened to provide access to the inside of enclosure 101.

Sitting atop and connected to cover 104 are the various control and measurement devices of the present invention. Controller module 106 provides the operational control for the present invention, as described in more detail below, and provides the various setpoint and timing controls. The settings for the desired environment are input by the user through temperature setpoint knob 107, night-time temperature drop setpoint knob 107A, humidity setpoint knob 108, night-time humidity drop setpoint knob 108A, and photoperiod timer switches 109. Located adjacent to controller module 106 on cover 104 is heater module 110 and humidifier module 111. Mounted below control module 106 and within enclosure 101 is light source 112. Although only a single light source 112 is depicted on FIG. 1, one may utilize multiple light sources of various types. Light source 112 is provided with protective screening (not shown) which prevents the reptile from coming in contact with the light bulb or fixture.

The system is operated by a user adjusting temperature setpoint knob(s) 107 and 107A, humidity setpoint knob(s) 108 and 108A, and photoperiod timer switches 109 to the desired heat, humidity and light settings, respectively. Temperature gauge 120 and humidity gauge 121 allow the user to adjust the proper setpoints. Control module 106 provides, as described below, the proper signals to heater module 110, humidifier module 111 and light 112 to maintain the user-defined conditions within enclosure 101. Water reservoir 115 sits on top of humidifier module 111 and provides water, as described below with respect to FIGS. 2-4, for the operation of humidifier module 111. Water reservoir 115 has sealed lid 125 which can be removed to fill water reservoir 115.

Heater module 110 contains a heating element (not shown) that may be a heat lamp, a resistive heater coil, incandescent light bulb, ultraviolet light bulb, or any other suitable heating device. If one uses a visible light-producing heating element within heater module 110 then one may also want to provide a shroud on heater module 110 to conduct heat but not light from the heater module 110 to enclosure 101. The heater element receives an appropriate signal, generated as described below, and is caused to operate as necessary to maintain the desired sensible temperature condition within enclosure 101.

Light 112 is a fluorescent light fixture and bulb assembly providing a broad spectrum light to the interior of enclosure 101. One skilled in the art will recognize that any type of light suitable for a particular bio-environment could be used in place of light 112 and that light 112 may have multiple light elements generating different types of light and heat. The operation of light 112 is controlled by a signal from a timer (not shown), having timer switches 109, over a wire (not shown) between light 112 and the timer. The timer is any kind of device providing a switch control, timer switches 109, which allows a user to define on/off time periods. In one embodiment of the present invention, the timer is a household, digital or mechanical light timer with which the user can program certain ON periods and certain OFF periods through proper settings of timer switches 109. Those skilled in the art will recognize that more sophisticated means, as in an electronic circuit or otherwise, could be used to control the operation of light 112. In a further embodiment, the timer and control module 106 includes switching logic, as described with respect to FIG. 9, that simultaneously reduces the wet-bulb and dry-bulb temperature set-points to simulate the temperature drop which occurs during the night in the natural outdoor environment.

In operation, the user defines the desired environment within enclosure 101 by adjusting the just-described temperature, humidity, and light control timer knobs and switches of control module 106. The sensible temperature of enclosure 101 is measured by dry-bulb temperature sensor 113. The humidity level within enclosure 101 is determined by measuring the wet-bulb temperature with wet-bulb temperature sensor 122, as described below with respect to FIGS. 2-4. The output signals of dry-bulb temperature sensor 113 and wet-bulb temperature sensor 122 are both input to control module 106. The dry-bulb and wet-bulb temperatures are processed, as described below, to produce output signals to heater module 110 and humidifier module 111. The respective operations of heater module 110 and humidifier module 111 are thereby controlled to bring about the desired environment within enclosure 101.

Figure 2:
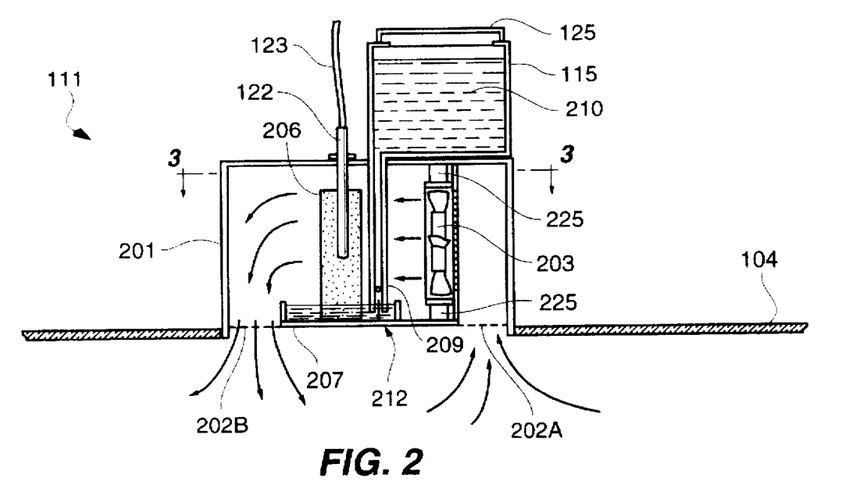
FIG. 2 depicts a sectional side view of the enclosure.
Figure 3:
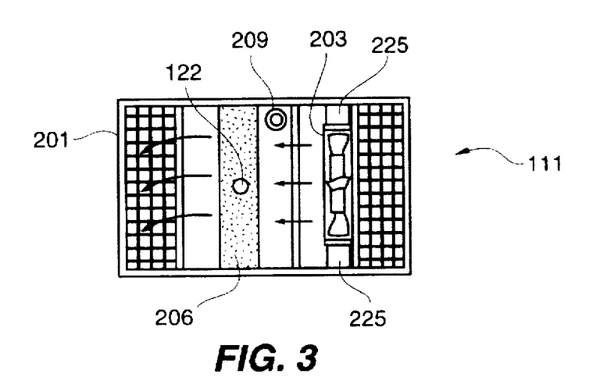
FIG. 3 depicts a top sectional view of the enclosure.
Figure 4:
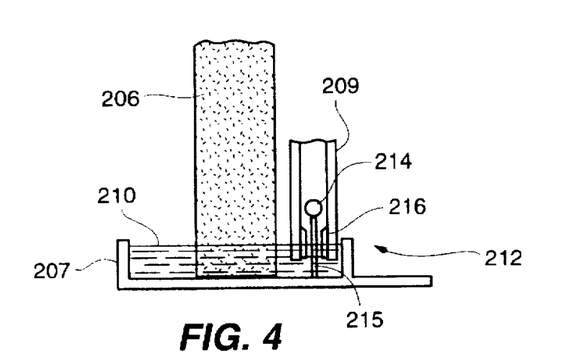
FIG. 4 illustrates a detailed view of a feature of the present invention.

Humidifier Module—FIGS. 2-4

FIG. 2 is a side sectional view of humidifier module 111 showing water reservoir 115 sitting atop humidifier housing 201. Humidifier module 111 is connected, via fasteners or other suitable means (not shown), to hinged cover 104 immediately above openings 202A and 202B in hinged cover 104. Fan 203, which is mounted to humidifier module 110 using vibration isolators 225, is caused to operate when a signal from control module 106 is transmitted to fan 203 causing fan 203 to operate. Vibration isolators 225 serve to seal and support the sides of the fan and minimize noise during operation of fan 203. Vibration isolators 225 may be composed of a flexible adhesive or sealant such as silicone or any other pliant seal. Electrical power is supplied to fan 203 through a power cord (not shown). Air is drawn from within enclosure 101 by the operation of fan 203.

Evaporative media 206 extends across the width of humidifier housing 201 as shown in FIG. 3. FIG. 3 is a top sectional view of humidifier housing 111 with reservoir 115 removed for clarity showing the extent of evaporative media 206. It is not required that evaporative media 206 extend across the full width of humidifier housing 201 but the humidifying efficiency of humidifier module 111 is improved with such an arrangement. Referring again to FIG. 2, evaporative media 206 rests in tray 207 which is kept continually wet by a supply of water 210 from fill tube 209. Fill tube 209 communicates with water reservoir 115 to direct water as needed from water reservoir 115 to tray 207. Valve assembly 212 which controls the flow of water 210 from fill tube 209 to tray 207 is described in more detail with respect to FIG. 4.

FIG. 4 illustrates a sectional view of fill tube 209 and in particular valve assembly 212. Elastomeric seal 216 encircles the inner circumference of the bottom end of fill tube 209. When reservoir 115, to which fill tube 209 is attached, is removed from humidifier module 111, ball 214 is forced by the pressure of water 210 against elastomeric seal 216. Thus, water 210 does not leak from reservoir 115 through fill tube 209 when reservoir 115 is removed from humidifier module 111. When reservoir 115 is in place in humidifier module 111, pin 215 pushes ball 214 up and apart from elastomeric seal 216. Water 210 thus flows from fill tube 209 into tray 207 when reservoir 115 is in place in humidifier module 111. Pin 215 is solidly mounted to tray 207 and positioned to align with the center of fill tube 209.

Evaporative media 206 is a sponge or other suitably absorbent material that draws the water from tray 207 through wicking or capillary action thus keeping the media continuously moist as water is carried off as vapor by the air forced through humidifier module 111. This eliminates the need for a pump or other means for transferring water to evaporative media 206. Inserted inside of evaporative media 206 is wet-bulb temperature sensor 122. Wet-bulb temperature sensor 122 is maintained in the moist environment of evaporative media 206. Wire 123, over which the wet-bulb temperature is transmitted, is connected at one end to wet-bulb temperature sensor 122 and at its other end to control module 106, as described below. Those skilled in the art recognize that various configurations of evaporative media 206 and reservoir 115 can be used to keep evaporative media moist. For example, reservoir 115 can be positioned to hang below hinged cover 104 within enclosure 101. Evaporative media 206 can then simply extend into reservoir 115 and wick water up into humidifier module 111.

When it is determined by control module 106 that more moisture is required within enclosure 101 to maintain the desired humidity level, fan 203 is activated by a signal from control module 106 and fan 203 is thereby caused to spin. As a result of the operation of fan 203, air from within enclosure 101 is drawn through opening 202A, through fan 203, through evaporative media 206 and back into enclosure 101 through opening 202B. As the air passes through evaporative media 206 it picks up additional moisture, therefore the air entering enclosure 101 through opening 202B contains more moisture than the air exiting enclosure 101 through opening 202A. A means for heating the water (not shown) could be used in conjunction with the fan to improve the efficiency of the humidifier module.

Figure 5:
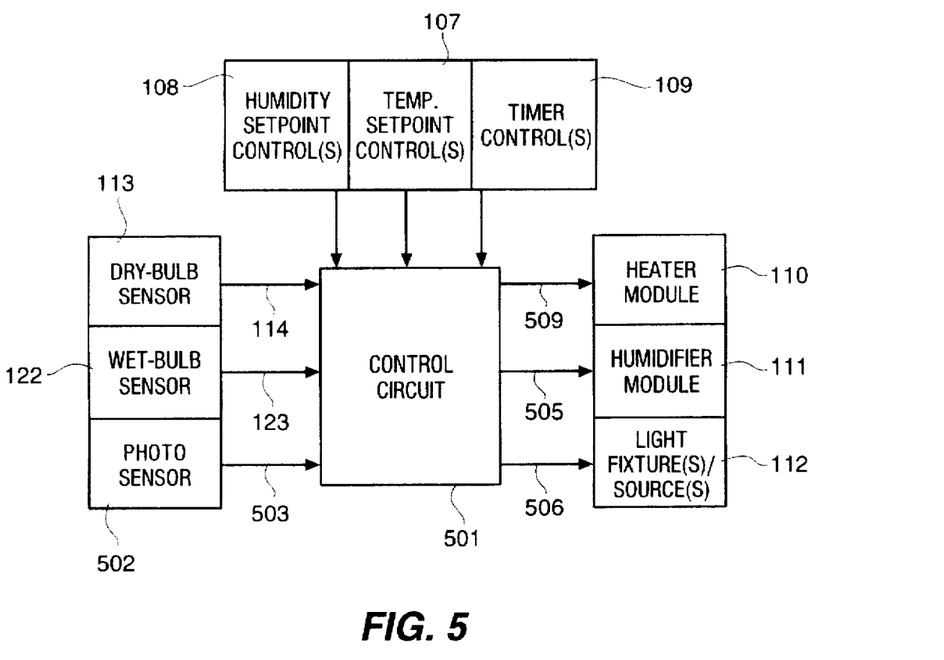
FIG. 5 illustrates in block diagram form the control methodology of the inventive system.

Control Module General Operation—FIG. 5

FIG. 5 illustrates in block diagram form the overall control methodology of environmental control system 100. Control module 106 receives inputs defining the user-desired state of the environment within enclosure 101. Those inputs defining the user-desired state include the settings of humidity setpoint knob 108, temperature setpoint knob 107, and timer switches 109. Control module 106 also receives inputs defining the current state of the environment within enclosure 101. Those inputs defining the current state of the environment within enclosure 101 include the signal from dry-bulb temperature sensor 113 over line 114, and the signal from wet-bulb temperature sensor 122 over line 123. All of these inputs are processed by control circuit 501 as described with respect to FIGS. 6–9 to provide control signals to heater module 110, humidifier module 111, and light 112 over lines 504–506, respectively.

As noted above, in one embodiment of the present invention, the timer is a common household timer. In this embodiment, the operation of light 112 is controlled entirely by the setting of timer switches 109. Timer switches 109 and the timer are physically combined with the other components of control module 106 in order to provide a simple and compact package. In another embodiment of the present invention, as described below with respect to FIG. 9, the timer includes switching logic that simultaneously reduces the wet-bulb and dry-bulb temperature set-points to simulate the temperature drop which occurs during the night in the natural reptilian environment.

In still another embodiment of the present invention, photo-sensor 502 is utilized to provide a signal to control circuit 501 that is indicative of the ambient lighting conditions in the area in which enclosure 101 is maintained. In this way, the operation of light 112 is coordinated with the ambient light within the area where enclosure 101 is maintained. For example, if the setting of timer switches 109 indicate to control circuit 501 that light 112 should be turned on but photo-sensor 502 indicates that appropriate lighting conditions already exist, then the setting of timer switches 109 can be over-ridden by control circuit 501.

Figure 7:
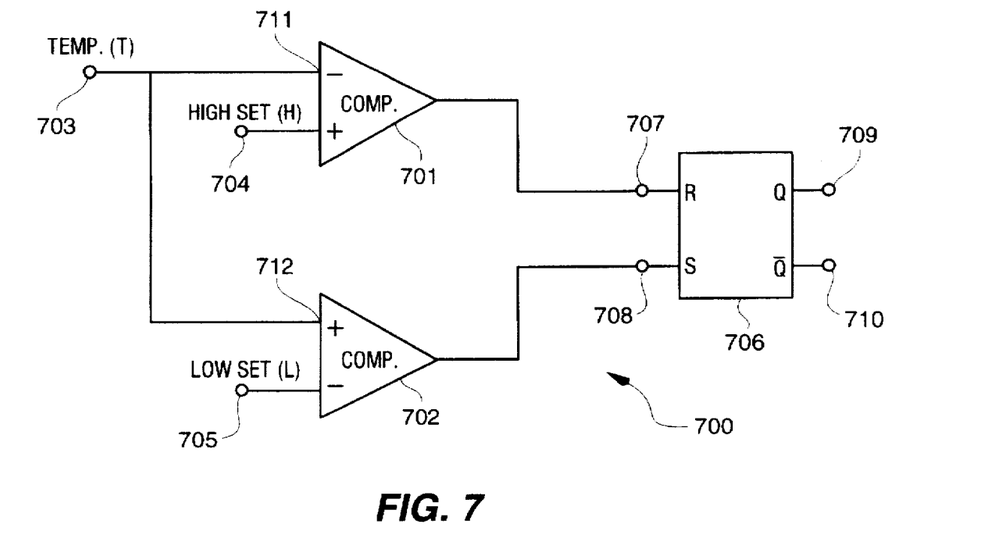
FIG. 7 is a simplified schematic of an embodiment of the control circuit of the present invention.
Figure 8:
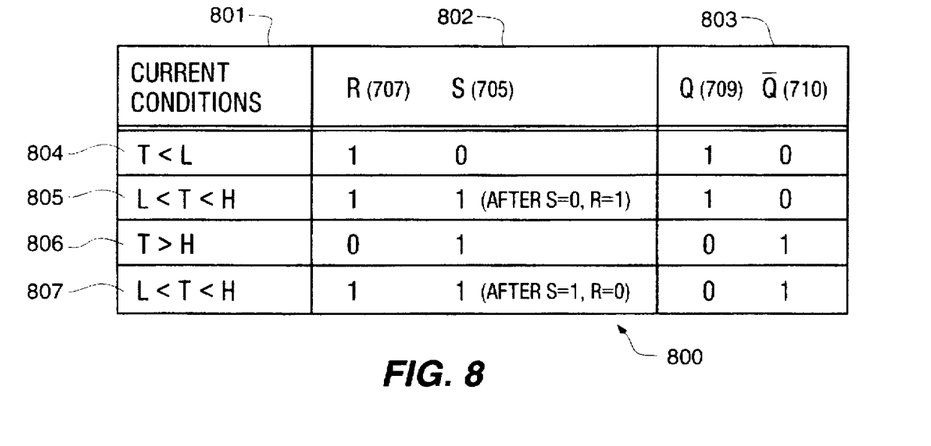
FIG. 8 is a state table summarizing the logical inputs and outputs of the control circuit of the present invention.

Control Module Detailed Operation—FIGS. 7–8

FIGS. 7–8 illustrate one embodiment of control circuit 501. FIG. 7 illustrates switching circuit 700. In an actual implementation of the present invention there are two similar circuits 700, one for processing the dry-bulb temperature reading and one for processing the wet-bulb temperature reading. For purposes of describing the operation of switching circuit 700, input 703 is the output of either dry-bulb temperature sensor 113 or wet-bulb temperature sensor 122 as both signals are processed in similar fashion. Input 703 is connected to the negative terminal of comparator 701 and the positive terminal of comparator 702. The voltage level at input 703 will vary with changes in temperature, in the case of temperature sensor 113, or humidity, in the case of wet-bulb sensor 122.

A voltage source (not shown) and an adjustable resistor network (not shown) produce a high-setpoint voltage input to positive terminal 704 of comparator 701. A second voltage source (not shown) and a second adjustable resistor network (not shown) produce a low-setpoint voltage input to negative terminal 705 of comparator 702. The low-setpoint is a voltage representative of the temperature at which, in the case of heater module 110, the heating element is to turn on and, in the case of humidifier module 111, the temperature at which fan 203 is to turn on. The high-setpoint is a voltage representative of the temperature at which, in the case of heater module 110, the heating element is to be turned off, and in the case of humidifier module 111, the temperature at which fan 203 is to be turned off. The output of comparator 701 provides a logical "1" or "0" to R input 707 of latch 706 and the output of comparator 702 provides a logical "1" or "0" to S input 708 of latch 706. The state of output Q at terminal 709 and output Q' at terminal 710 is summarized in state table 800 of FIG. 8.

State table 800 is comprised of current conditions column 801, latch input column 802 and output column 803. State table 800 is first described with respect to the processing of the output of dry-bulb temperature sensor 113. Line 804 represents the inputs and outputs for the situation when the measured temperature (T) as represented by the voltage output of temperature sensor 113 at terminal 703 is less than the low-setpoint (L) voltage at terminal 705 of comparator 702. Line 804 is indicative of the condition where the temperature in enclosure 101 is below the desired temperature range. In this event comparator 702 produces an output of "0" thus providing a "0" input to terminal 708 of latch 706 and comparator 701 produces an output of "1" thus providing a "1" input to terminal 707 of latch 706. These inputs result in a state of "1" at the Q output 709 of latch 706. If Q output 709 is used to control the operation of heater module 110 then when the measured temperature within inclosure 103 is below the desired low temperature setpoint then the heating element will be turned on.

As the temperature within enclosure 101 rises, the sensed temperature (T), indicated as a voltage at terminal 703, will eventually exceed the low-setpoint voltage (L) at terminal 705 of comparator 702 but will still be below the high-setpoint voltage (H). This is the situation illustrated in line 805 of state table 800. The state of Q output 709 is the same for this situation and, continuing with the example of the control of heater module 110, the heating element remains on. When the temperature within enclosure 101 results in a voltage at input 703 that exceeds the high-setpoint voltage (H) at terminal 704 of comparator 701, as illustrated by line 806 of state table 800, the state of Q output 709 changes to a logical "0". This means that when the temperature within enclosure 101 results in a voltage input 703 that exceeds the high-setpoint voltage (H), the heater element in heater module 110 is turned off.

The switching differential hysteresis loop of the above-described control is defined by the difference between the low-setpoint voltage at terminal 705 and the high-setpoint at terminal 704. After heater module 110 is turned off and the temperature within enclosure 101 begins to drop, the temperature within enclosure 101 will eventually fall to a point at which a voltage is generated at input 703 that is less than the high-setpoint voltage (H), as illustrated by line 807 of state table 800. Q output 709 remains off, according to the operation of latch 706, as sensed temperature (T) at terminal 703 again drops toward the low temperature setpoint. When the sensed temperature generates a voltage at terminal 703 that is below the low-setpoint voltage (L), switching circuit 700 is again in the state illustrated by line 804 of state table 800.

Thus, the low-setpoint voltage and the high-setpoint voltage are programmed not only to define the temperatures at which the output of latch 706 changes but also to define the width of the switching differential hysteresis loop in that Q output 709 of latch 706 goes low ("0") when the sensed temperature (T) goes above the high-setpoint voltage (H) and Q output 709 and remains low until the sensed temperature (T) goes below the low-setpoint (L).

The above description of FIGS. 7–8 was provided with respect to processing the output of dry-bulb temperature sensor 113 at terminal 703. A similar circuit 700 is used to process the output of wet-bulb temperature sensor 122. The relative humidity of an environment can be measured by making a wet-bulb temperature measurement. A wet-bulb temperature measurement is related in a known way to the dry bulb temperature and relative humidity of the environment in which the wet-bulb reading is taken. Therefore, the output of wet-bulb temperature sensor 122 is directly representative of the relative humidity within enclosure 101 when the dry bulb temperature is actively controlled within a known temperature range. As the humidity within enclosure 101 drops to a point that a voltage is generated at terminal 703 that is below the low-setpoint, as illustrated in line 804 of state table 800, Q output 709 of latch 706 goes high thereby turning on fan 203 of humidifier module 111. Fan 203 draws relatively dry air from enclosure 101 through evaporative media 206 and returns relatively moist air to enclosure 101. When the humidity within enclosure 101 generates a voltage at input 703 that exceeds the high-setpoint voltage (H) as defined by the voltage at terminal 704 of comparator 701, Q output 709 of latch 706 goes low as illustrated in line 806 of state table 800. The same hysteresis quality is effective with respect to processing of the wet-bulb temperature measurement in that Q output 709 remains low until the humidity drops to a level that generates a voltage at input 703 that is below the low-setpoint voltage (L). It is apparent to those skilled in the art that the resistor networks (not shown) used to define the high-setpoint voltage at terminal 704 and the low-setpoint voltage at terminal 705 can be, and likely will need to be, different from the resistor networks used to define the corresponding setpoints in a switching circuit 700 used with respect to the dry bulb temperature measurement.

Those skilled in the art recognize that any circuit design that satisfies the conditions of state table 800 is suitable for processing the dry-bulb temperature and wet-bulb temperature. There are numerous circuits which meet this criteria, some of which are implemented in discrete parts, as in FIGS. 7-8, and some of which are implemented utilizing specialized integrated circuits, as in FIGS. 6 and 9 below.

Figure 6:
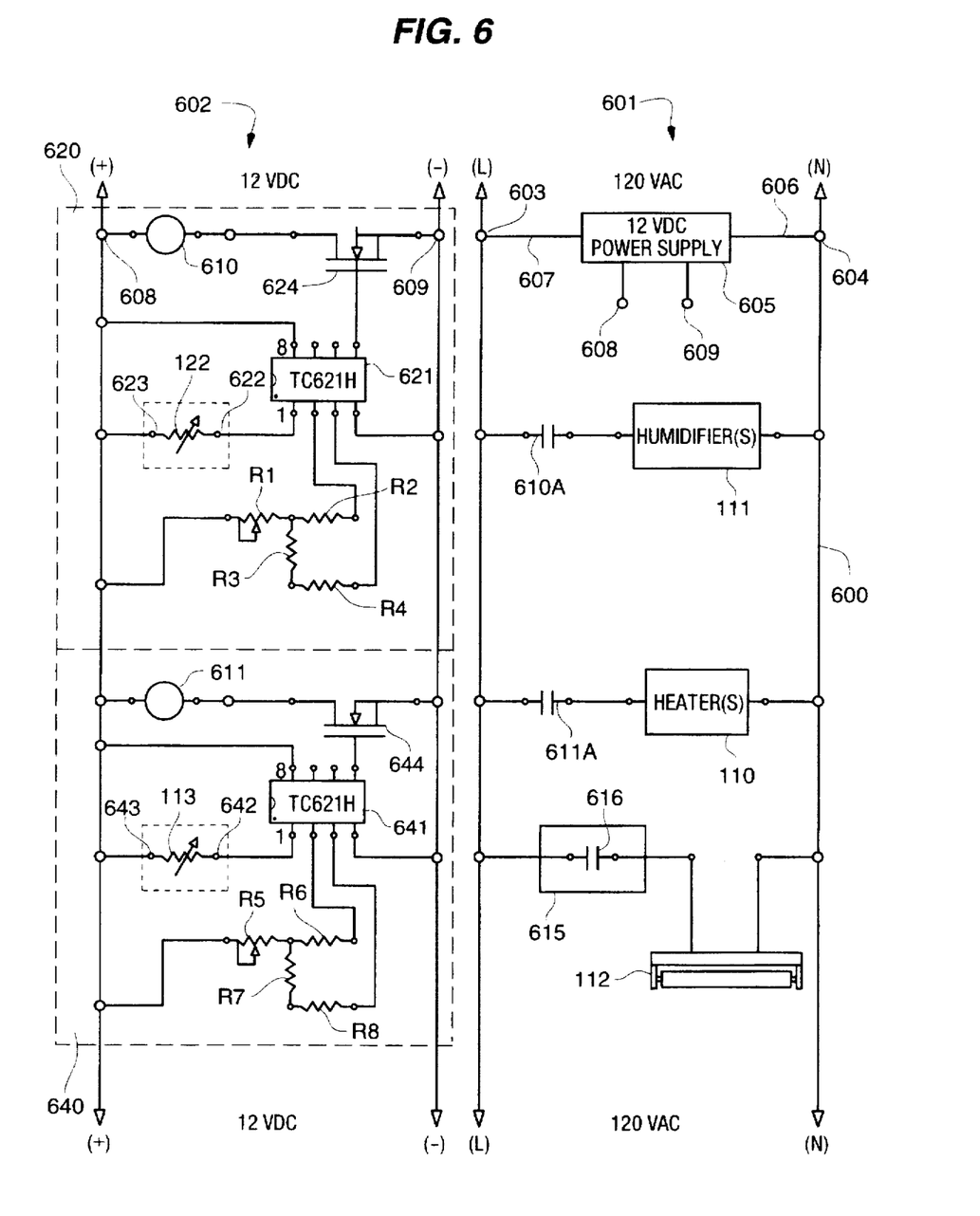
FIG. 6 is a schematic of an embodiment of the control circuit of the present invention.

Control Module Detailed Operation—FIG. 6

FIG. 6 illustrates another embodiment of control circuit 501 of FIG. 5. Control circuit 600 utilizes specialized temperature switching integrated circuits, as described below, to implement the logic of state table 800 of FIG. 8. Control circuit 600 is comprised of essentially two parts; AC circuit 601 and DC circuit 602. AC circuit 601 includes AC line input terminal 603 and AC neutral input terminal 604 to which are connected the line and neutral input from a 120 volts AC source (not shown). Power supply 605 is one of a number of well known designs for converting AC line voltage to a regulated output of 12 volts DC. Power supply 605 accepts AC line voltage over lines 606 and 607 and outputs a DC voltage of 12 volts at terminals 608 and 609.

Humidifier module 111 and heater module 110 are connected through relay contacts 610A and 611A, respectively, to AC input terminals 603 and 604. When relays 610 and 611 are open, heater module 110 and humidifier module 111 are in an open circuit and no power is available to the modules for their operation. When relays 610 and 611 are energized, contacts 610A and 611A are closed, heater module 110 and humidifier module 111 receive AC power from AC input terminals 603 and 604. In the case of heater module 110, when contact 611A of relay 611 is closed, thereby providing power to heater module 110, the heating element (not shown) within heater module is caused to operate. In the case of humidifier module 111, when contact 610A of relay 610 is closed, thereby providing power to humidifier module 111, fan 203 within humidifier module 111 is caused to operate. The function of relays 610 and 611 is controlled by the operation of DC circuit 602. Timer 615 having switch 616 turns on or off according to the setting of timer switches 109. During on periods, switch 616 closes thereby causing light(s) 112 to operate.

DC circuit 602 is comprised of humidity control circuit 620 and temperature control circuit 640. Humidity control circuit 620 and temperature control circuit 640 are nearly identical and therefore a detailed description will be provided only of humidity control circuit 620 and thereafter those aspects of temperature control circuit 640 which differ from humidity control circuit 620 are noted.

Temperature switch 621 is a solid-state temperature sensor such as can be obtained as part number TC621H from TelCom Semiconductor, Inc. Pin 1 of temperature switch 621 receives the voltage output, at terminal 622, of wet-bulb sensor 122. The second terminal of wet-bulb sensor 122, terminal 623, is connected to positive 12 VDC at terminal 608. Wet-bulb sensor 122 is a 100 KΩ negative temperature coefficient thermistor. As the humidity within enclosure 101 changes, and thus the temperature sensed by wet-bulb sensor 122, the resistance between terminals 622 and 623 changes. Since the voltage at terminal 623 is a constant 12 VDC, the voltage at terminal 622 and pin 1 of temperature switch 621 varies with changes in humidity within enclosure 103.

Pin 2 of temperature switch 621 is the High Set input for temperature sensor 621 and Pin 3 is the Low Set input for temperature sensor 621. The resistor network comprised of resistors R1, R2, R3, and R4 are exemplary of a resistor networks used to define the high-setpoint voltage at terminal 704, and low-setpoint voltage at terminal 705 described above with respect to FIG. 7. R1 is a variable resistor or potentiometer having a value of 50 KΩ. R2 and R4 are 47 KΩ resistors and R3 is a 3.3 KΩ resistor. The width of the hysteresis loop is defined by the value of R3. The larger the resistance provided by R3 the greater will be the gap in humidity represented by the low-setpoint voltage and the high-setpoint voltage. The humidity setpoint is determined by the setting of R1. Humidity setpoint knob 108 is connected to R1 and is the means for adjusting R1 for the appropriate level of humidity within enclosure 101.

As the humidity within enclosure 101 drops at a given sensible temperature, the resistance of wet-bulb sensor 122 increases. The increase in resistance of wet-bulb sensor 122 results in a decrease in the voltage at pin 1 of temperature sensor 621. When the humidity within enclosure 101 drops to a level that results in a voltage at pin 1 of temperature switch 621 that is less than the voltage at the Low Set Input of pin 3, the Control Output at pin 5 will go to a logical high ("1"). This causes Field Effect Transistor (FET) 624 to conduct thereby providing 12 VDC to relay 610. FET 624 is a three terminal semiconductor device in which a voltage at one terminal, connected to the control output of pin 5 of temperature sensor 621, can control a current flowing between the second and third terminal. An example of such a device is part number IRF510 available from Radio Shack. When relay 610 is energized, relay contact 610A closes causing 120 VAC to be applied to humidifier module 111. This causes fan 203 to operate thereby causing an increase in the humidity of the environment within enclosure 101, as described above with respect to FIG. 1. When the humidity level increases sufficiently, the voltage at pin 1 of temperature switch 621 increases to the point that it exceeds the voltage at the High Set Input of pin 2. This causes the Control Output at pin 5 of temperature switch 621 to switch to a logical low ("0"). FET 624 thereby ceases conduction and power is removed from humidifier module 111. The switching differential hysteresis loop ensures that power will not again be applied to humidifier module 111 until the humidity level within enclosure 101 drops low enough to again result in a voltage at pin 1 that is less than the voltage at pin 3.

Temperature control circuit 640 operates to control the operation of heater module 110 in the same manner as just described with respect to the control of humidifier module 111 by humidity control circuit 620. Temperature switch 641 is a similar integrated circuit to temperature switch 621 and operates in precisely the same fashion. Resistors R5–R8 correspond to resistors R1–R4 of humidity control circuit 620, respectively. R5, a variable resistor or potentiometer, is set by adjustment of temperature control knob 107 and determines the desired temperature setting for enclosure 101.

As the temperature within enclosure 101 drops, as sensed by dry-bulb temperature sensor 113, the voltage at pin 1 of temperature switch 641 eventually becomes less than the voltage at pin 3 of temperature switch 641. This condition causes a logical high output at pin 5 of temperature switch 641. A high output at pin 5 causes FET 644 to conduct thereby energizing relay 611. Relay contact 611A closes when relay 611 is energized. This causes power to be applied to heater module 110. The heating element within heater module 110 is thereby caused to operate.

Figure 9:
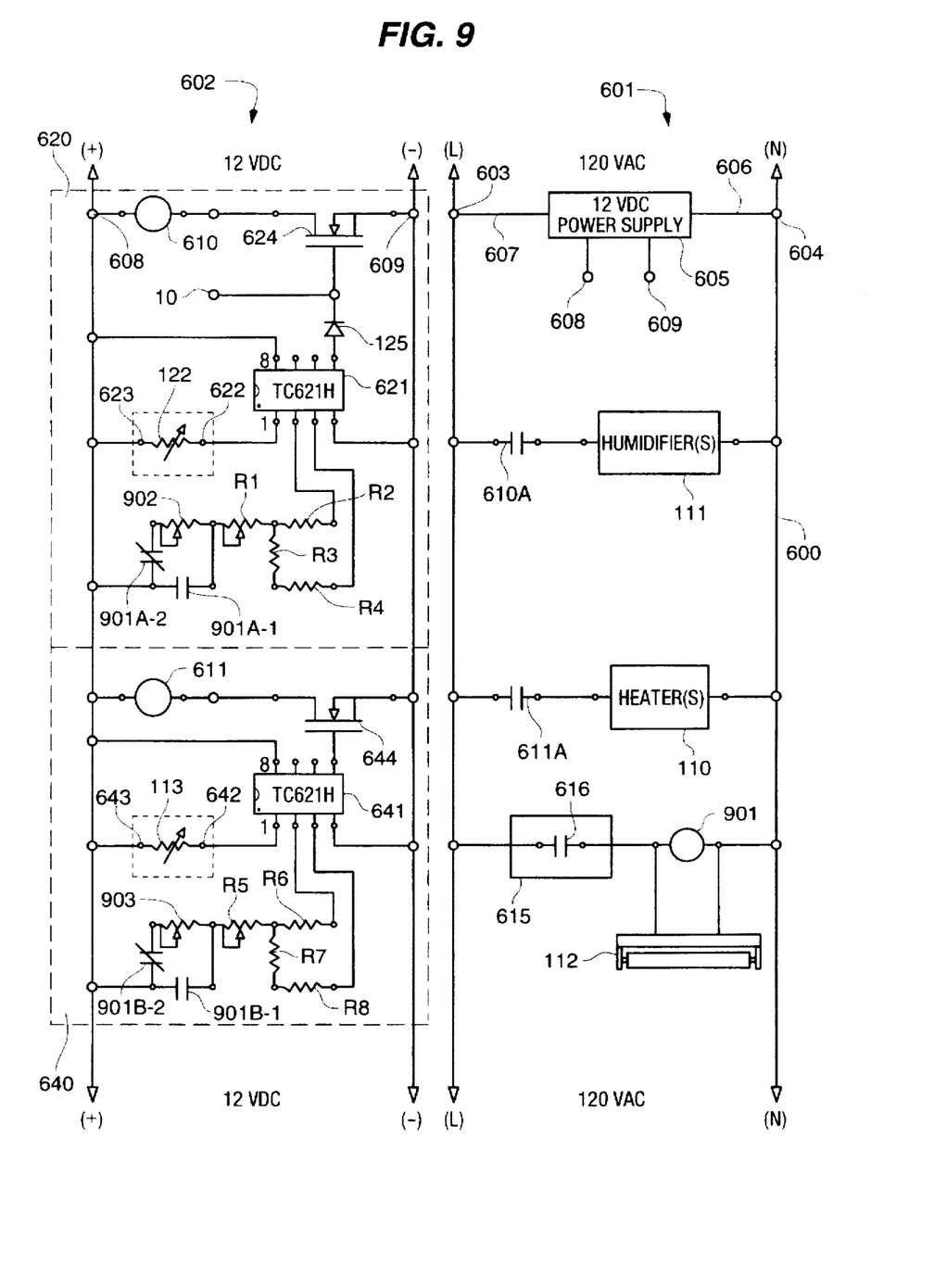
FIG. 9 is a schematic of an embodiment of the control circuit of the present invention in which the night-time temperature and humidity drop setpoints are utilized.

FIG. 9 illustrates a further embodiment of the control circuit of the present invention. Since the control circuit illustrated in FIG. 9 is similar to the control circuit of FIG. 6, common elements are referred to with the same reference numerals as in FIG. 6. The control circuit of FIG. 9 includes elements not found in FIG. 6. These additional elements are effective to provide the night-time temperature drop selected with night-time temperature drop setpoint knob 107A and to provide the night-time humidity drop selected with night-time humidity drop setpoint knob 108A.

The circuit elements common to FIGS. 9 and 6 are not described with respect to FIG. 9 since they have already been described with respect to FIG. 6.

The night-time temperature and humidity setback feature works as follows. As in the circuit of FIG. 6, switch 616 of timer 615 closes when, according to the setting of timer input switches 109, an ON time period begins. As described with respect to FIG. 6, this causes 120 VAC to be applied to light(s) 112. In the control circuit of FIG. 9, however, relay 901 is energized when timer 615 turns on. Relay 901 is a double-pole, double-throw relay having contacts 901A-1, 901A-2 and 901 B-1, 901 B-2. When relay 901 is energized, contacts 901 A-1 and 901 B-1 are closed and contacts 901A-2 and 901 B-2 are open. The resultant operation of humidity control circuit 620 and temperature control circuit 640 is identical to that described with respect to FIG. 6.

When timer 615 is in an OFF period, i.e. switch 616 is open, relay 901 is not energized. This corresponds to a simulated night-time period. When relay 901 is de-energized, contacts 901A-2 and 901 B-2 are closed and contacts 901 A-1 and 901 B-1 are open. This operates to switch variable resistors 902 and 903 into humidity control circuit 620 and temperature control circuit 640, respectively. The value of variable resistor 902 is determined by the setting of night-time humidity drop setpoint knob 108A. The value of variable resistor 903 is determined by the setting of night-time temperature drop setpoint knob 107A. During the simulated night-time periods, in the case of the humidity control circuit 620, the added resistance of variable resistor 902 adjusts downward the high and low humidity setpoints determined by the resistor network of humidity control circuit 620. Likewise, the added resistance of variable resistor 903 adjusts downward the high and low temperature setpoints determined by the resistor network of temperature control circuit 640. In operation, the humidity and temperature setpoints for enclosure 101 are slightly lower during the simulated night-time periods. This effectively simulates the natural reptilian environment.

Figure 10:
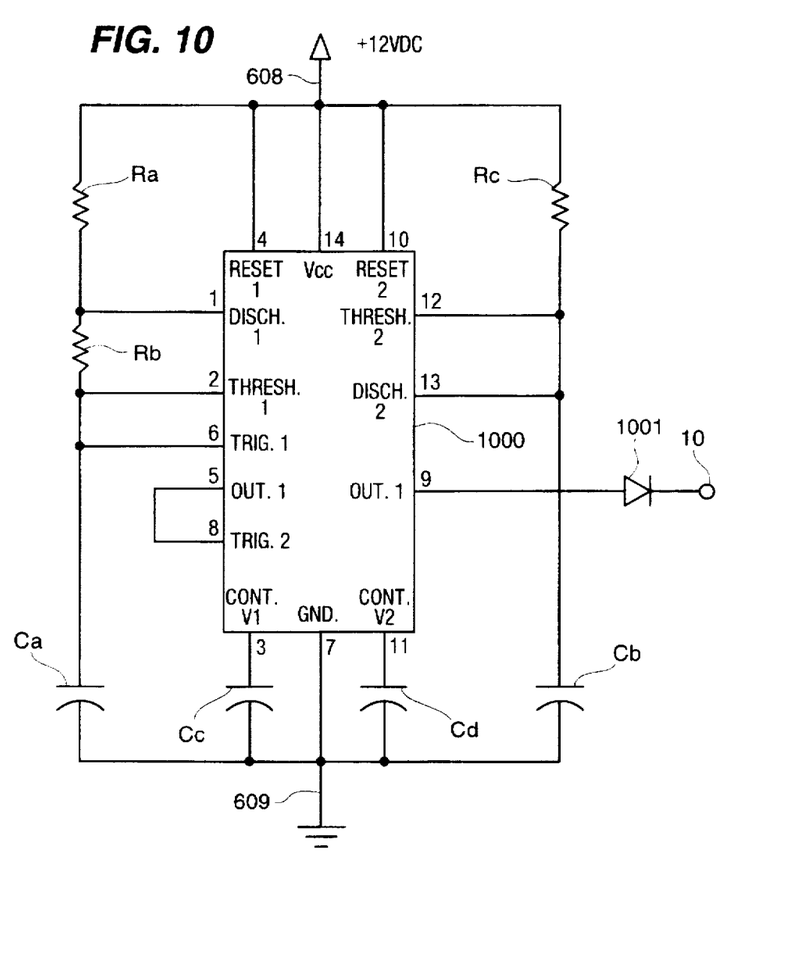
FIG. 10 is a schematic of the fan timer circuit.

FIG. 10, in combination with FIG. 9, illustrates a further feature of the control circuit of the present invention. In order to generate a more accurate humidity measurement it is desirable to run fan 203 of humidifier module 111, with reference to FIG. 1, for a period of time so that air from enclosure 101 moves through evaporative media 206 and wet-bulb temperature sensor 123. A more accurate humidity measurement is achieved when air moves past wet-bulb temperature sensor 123 as compared to when the air stagnates around wet-bulb temperature sensor 123.

Timer chip 1000 is a standard, commercial grade dual timer chip known by the model designation "556". There are two independent timer circuits on timer chip 1000. The output of timer 1 at pin 5 of timer chip 1000 is connected to the trigger of timer 2 at pin 8. Timer 1 is connected as a stable oscillater which oscillates at a period determined by resistor Ra and capacitor Ca. Resistor Ra is nominally a 5 MΩ resistor and capacitor Ca is nominally a 220 µF capacitor which result in a osillation period for timer 1 of about 20 minutes. This osillation period can be modified by adjusting the values of Ra and Ca in a known fashion. Timer 2 is a one-shot that drives relay 610, of FIG. 9, via terminal 1, as described below. The run-time of timer 2 once triggered by timer 1 is determined by resistor Rc and capacitor Cb. Resistor Rc is nominally a 470K resistor and capacity Cb is nominally a 100 µF capacitor which result in run-time of about 50 seconds. This period can be modified by adjusting the values Rc and Cb in a known fashion. Capacitor Cc having a value of 0.05 µF is connected between pin 3 and 0 VDC. Capacitor $C_d$ having a valve of 0.05 µF is connected between pin 11 and 0 VDC. Resistor $R_b$, nominally 1000Ω is connected between pins 1 and 2. Once each cycle, about 20 minutes, timer 1 triggers timer 2 to go high for about 50 seconds. When the timer 2 output at pin 9 goes high, diode 1001 conducts the high logic level to terminal 10. Terminal 10 is also illustrated on FIG. 9 and those skilled in the art will recognize that a high voltage level at terminal 1 causes FET 624 to conduct thereby energizing relay 610. As noted above with respect to FIG. 6, the energizing of relay 610 causes power to be applied to humidifier module 111 and, in particular, fan 203. Thus fan 203 is caused to operate for about 50 seconds during which time an accurate wet-bulb temperature reading is obtained from wet-bulb temperature sensor 123. Diode 925 protects pin 5 of temperature switch 621 from the voltage at terminal 10. After the 50 second run-time of timer 2 on timer chip 1000, control of FET 624 returns to temperature switch 621. Thus, if operation of humidity control circuit 620 determines that humidifier module 11 should operate, humidifier module 111 will continue to operate after timer 2 of switch 1000 has completed its 50 second run time. The embodiment of the control circuit of the present invention illustrated in FIG. 10 and FIG. 9 ensures a more accurate wet-bulb temperature reading and therefore a more accurate humidity determination.

Summary

A comprehensive environment control system is provided that senses the current environment conditions and provides control signals to appropriate system components. The temperature, humidity and photo-period are thus maintained at the conditions desired and defined by the user. Although specific embodiments are disclosed herein, it is expected that persons skilled in the art can and will design alternative heat, humidity, and light generation systems that are within the scope of the following claims either literally or under the Doctrine of Equivalents.

I claim:

1. An environment control system for maintaining a suitable reptile or amphibian environment within an enclosure, comprising:

means for measuring a sensible temperature within said enclosure;

control means responsive to measuring said sensible temperature for maintaining said sensible temperature between a low setpoint temperature and high setpoint temperature;

means for measuring a wet-bulb temperature within said enclosure; and control means responsive to measuring said wet-bulb temperature for maintaining said wet-bulb temperature between a low setpoint wet-bulb temperature and a high setpoint wet-bulb temperature.

2. The apparatus of claim 1 wherein said energizing means comprises:

means responsive to determining that said sensible temperature is below said low setpoint temperature for energizing said heating element;

means responsive to determining that said sensible temperature is increasing from said low setpoint temperature to said high setpoint temperature for energizing said heating element;

means responsive to determining that said sensible temperature is above said high setpoint temperature for de-energizing said heating element; and means responsive to determining that said sensible temperature is dropping from said high setpoint temperature toward said low setpoint temperature for de-energizing said heating element.

3. The apparatus of claim 1 wherein said heating element is comprised of multiple heating elements.

4. The apparatus of claim 1 wherein said control means comprises;

means, responsive to receiving said wet-bulb temperature, for determining whether said wet-bulb temperature is below a low setpoint wet-bulb temperature, is increasing from a low setpoint wet-bulb temperature to a high setpoint wet-bulb temperature, is above said high setpoint wet-bulb temperature, or is dropping from said high setpoint wet-bulb temperature toward said low setpoint wet-bulb temperature;

humidifier means operable when energized to increase humidity within said enclosure; and means, responsive to determining said wet-bulb temperature, for energizing said humidifier means wherein said enclosure is maintained between said low setpoint wet-bulb temperature and said high setpoint wet-bulb temperature by the operation of said humidifier means.

5. The apparatus of claim 4 wherein said energizing means comprises:

means responsive to determining that said wet-bulb temperature is below said low setpoint wet-bulb temperature for energizing said humidifier means;

means responsive to determining that said wet-bulb temperature is increasing from said low setpoint wet-bulb temperature toward said high setpoint wet-bulb temperature for energizing said humidifier means;

means responsive to determining that said wet-bulb temperature is above said high setpoint wet-bulb temperature for de-energizing said humidifier means; and means responsive to determining that said wet-bulb temperature is dropping from said high setpoint wet-bulb temperature toward said low setpoint wet-bulb temperature for de-energizing said humidifier means.

6. The apparatus of claim 4 wherein said humidifier means is comprised of multiple humidity sources.

7. The apparatus of claim 1 wherein said means for measuring a wet-bulb temperature within said enclosure comprises:

a wet-bulb temperature sensor for producing a wet-bulb temperature signal;

evaporative media means wherein said wet-bulb temperature sensor is positioned within said evaporative means;

moisture source means positioned so that said evaporative media means draws moisture from said moisture source to maintain said wet-bulb temperature sensor in a moist environment;

fan means for circulating air from within said enclosure through said evaporative media and into said enclosure; and means for periodically operating said fan means so that said wet-bulb temperature sensor provides an accurate wet-bulb signal prior to operating said humidifier means.

8. The apparatus of claim 1 wherein said environment control system further comprises:

light source means; and light source control means for operating said light source means to simulate night and day lighting conditions within said enclosure.

9. The apparatus of claim 8 wherein said light source control means further comprises:

adjustable night-time sensible temperature setback control means for automatically altering said low setpoint temperature and said high setpoint to a second low setpoint temperature and a second high setpoint temperature, respectively, during said simulated night lighting condition; and adjustable night-time wet-bulb temperature setback control means for automatically altering said low setpoint wet-bulb temperature and said high setpoint wet-bulb temperature to a second low setpoint wet-bulb temperature and a second high setpoint wet-bulb temperature, respectively, during said simulated night lighting condition.

10. The apparatus of claim 2 wherein said heating element comprises:

an incandescent light bulb and fan positioned to transfer heat to the interior of said enclosure; and a shroud means for blocking light from said light bulb from shining on the interior of said enclosure.

11. The apparatus of claim 4 wherein said humidifier means comprises:

a wet-bulb temperature sensor for producing a wet-bulb temperature signal;

evaporative media means wherein said wet-bulb temperature sensor is positioned within said evaporative means;

moisture source means positioned so that said evaporative media means draws moisture from said moisture source to maintain said wet-bulb temperature sensor in a moist environment; and fan means for circulating air from within said enclosure through said evaporative media and into said enclosure.

12. The apparatus of claim 11 wherein said humidifier means further comprises a means for heating the water provided by said moisture source.

13. The apparatus of claim 1 wherein said environment control system further comprises:
   a humidity conversion means for converting said sensible temperature and wet-bulb temperature to a measured humidity signal;
   means, responsive to receiving said humidity signal, for determining whether said humidity is below a low setpoint humidity, is increasing from a low setpoint humidity to a high setpoint humidity, is above said high setpoint humidity, or is dropping from said high setpoint humidity toward said low setpoint humidity;
   humidifier means operable when energized to increase humidity within said enclosure; and
   means, responsive to determining said humidity, for energizing said humidifier means wherein said enclosure is maintained between said low setpoint humidity and said high setpoint humidity by the operation of said humidifier means.

14. The apparatus of claim 13 wherein said energizing means comprises:
   means responsive to determining that said humidity is below said low setpoint humidity for energizing said humidifier means;
   means responsive to determining that said humidity is increasing from said low setpoint humidity toward said high setpoint humidity for energizing said humidifier means;
   means responsive to determining that said humidity is above said high setpoint humidity for de-energizing said humidifier means; and
   means responsive to determining that said humidity is dropping from said high setpoint humidity toward said low setpoint humidity for de-energizing said humidifier means.

* * * * *